United States Patent
Yang et al.

(10) Patent No.: US 10,674,396 B2
(45) Date of Patent: Jun. 2, 2020

(54) METHOD AND APPARATUS FOR HANDLING COMPRESSION ERROR IN MOBILE COMMUNICATIONS

(71) Applicant: MediaTek Inc., Hsinchu (TW)

(72) Inventors: Zhu-Jun Yang, Hsinchu (TW);
Yu-Ting Yao, Hsinchu (TW);
Yu-Cheng Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/228,696

(22) Filed: Dec. 20, 2018

(65) Prior Publication Data

US 2019/0200257 A1 Jun. 27, 2019

Related U.S. Application Data

(60) Provisional application No. 62/608,660, filed on Dec. 21, 2017.

(51) Int. Cl.
*H04W 28/04* (2009.01)
*H04L 12/24* (2006.01)
*H04L 1/16* (2006.01)
*H04W 28/06* (2009.01)

(52) U.S. Cl.
CPC ............ *H04W 28/04* (2013.01); *H04L 1/16* (2013.01); *H04W 28/06* (2013.01)

(58) Field of Classification Search
CPC .................. H04W 28/04; H04L 1/16
See application file for complete search history.

(56) References Cited

U.S. PATENT DOCUMENTS

2003/0214930 A1* 11/2003 Fischer .................. H04Q 7/12

* cited by examiner

*Primary Examiner* — Ronald B Abelson
(74) *Attorney, Agent, or Firm* — Han IP PLLC; Andy M. Han (57) ABSTRACT

Various solutions for handling compression error with respect to user equipment and network apparatus in mobile communications are described. An apparatus may transmit a compressed protocol data unit (PDU) to a network node. The apparatus may receive a negative acknowledgement (NACK) message from the network node. The apparatus may restore a compressed service data unit (SDU) to original data. The apparatus may transmit the original data with an uncompressed format to the network node.

14 Claims, 7 Drawing Sheets

METHOD AND APPARATUS FOR HANDLING COMPRESSION ERROR IN MOBILE COMMUNICATIONS

CROSS REFERENCE TO RELATED PATENT APPLICATION(S)

The present disclosure is part of a non-provisional application claiming the priority benefit of U.S. Patent Application No. 62/608,660, filed on 21 Dec. 2017, the content of which is incorporated by reference in its entirety.

TECHNICAL FIELD

The present disclosure is generally related to mobile communications and, more particularly, to compression error handling with respect to user equipment and network apparatus in mobile communications.

BACKGROUND

Unless otherwise indicated herein, approaches described in this section are not prior art to the claims listed below and are not admitted as prior art by inclusion in this section.

In a wireless communication system, some data compression mechanisms may be used to compress a data packet to increase the bandwidth utilization. The data compression mechanisms may comprise robust header compression (ROHC) or uplink data compression (UDC). A user equipment (UE) may be configured to transmit uplink (UL) data to a network apparatus by using the data compression mechanisms.

When some errors happen, the network apparatus may not be able to decompress the UL data and may indicate the decompression failure to the UE. In response to the decompression failure, the UE should reset or reinitialize the compression parameters being used by the session. However, there may be some compressed UL data that have not been transmitted to the network apparatus. It is very likely that the network apparatus may drop those data due to decompression failure if the UE does not handle or re-compress those data.

Alternatively, after resetting or reinitializing the compression parameters, the UE may perform re-compression to those compressed UL data and transmit the re-compressed data to the network apparatus. The re-compressed data may be able to correctly be decompressed at the network apparatus. However, this may increase end-to-end latency due to the additional re-compression procedures. For some scenarios or applications, such extra latency may seriously affect the performance of the UE or the user experiences.

Accordingly, how to avoid decompression failure and reduce end-to-end latency for the compressed data may become an important issue in developing a communication system. It is needed to provide proper compression error handling mechanisms to deal with the compressed data for avoiding decompression failure and extra latency.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to compression error handling with respect to user equipment and network apparatus in mobile communications.

In one aspect, a method may involve an apparatus transmitting a compressed protocol data unit (PDU) to a network node. The method may also involve the apparatus receiving a negative acknowledgement (NACK) message from the network node. The method may further involve the apparatus restoring a compressed service data unit (SDU) to original data. The method may further involve the apparatus transmitting the original data with an uncompressed format to the network node.

In one aspect, an apparatus may comprise a transceiver capable of wirelessly communicating with a network nodes of a wireless network. The apparatus may also comprise a processor communicatively coupled to the transceiver. The processor may be capable of transmitting a compressed PDU to the network node. The processor may also be capable of receiving a NACK message from the network node. The processor may further be capable of restoring a compressed SDU to original data. The processor may further be capable of transmitting the original data with an uncompressed format to the network node.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to compression error handling with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Figure 1:
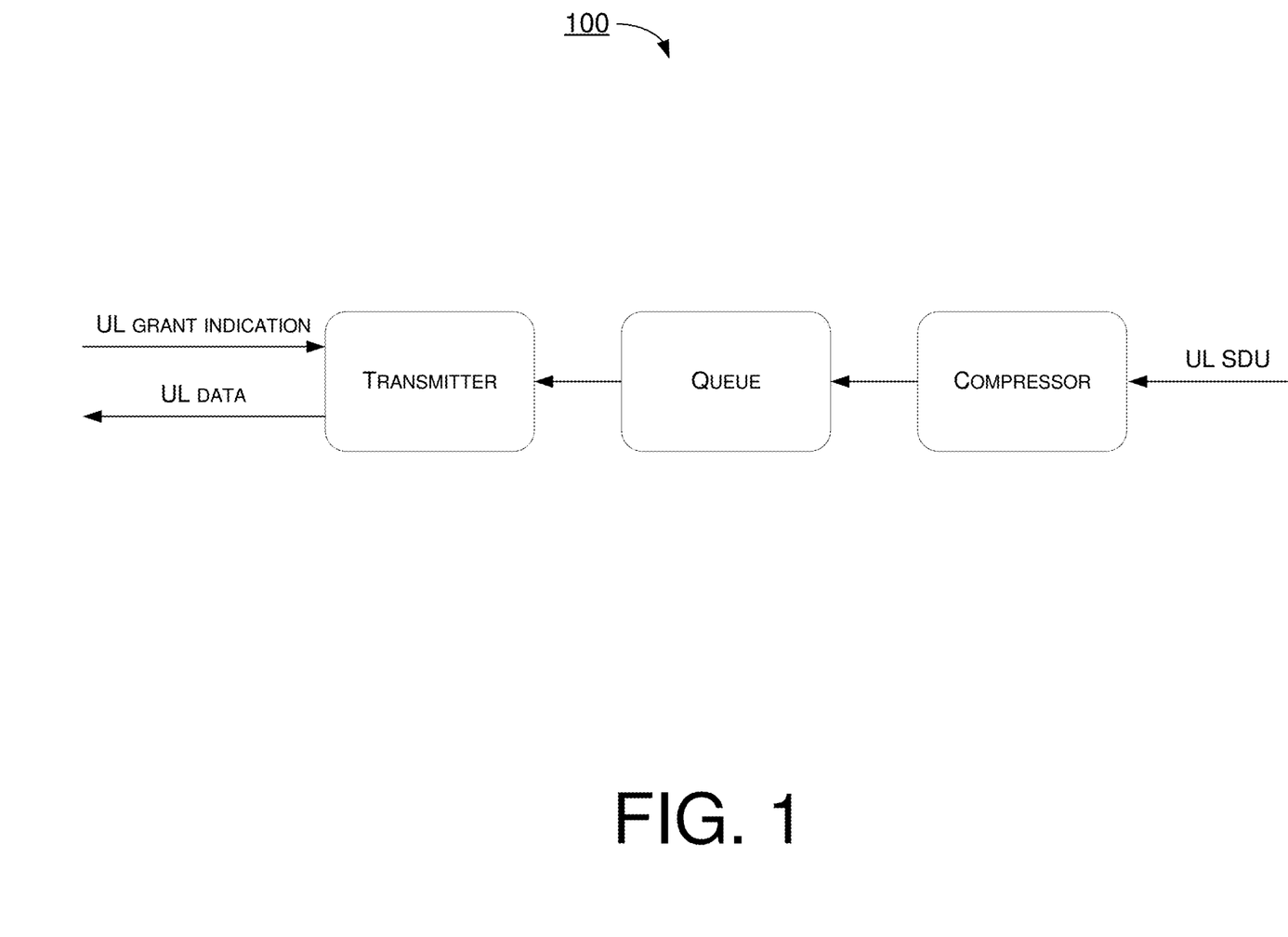
FIG. 1 is a diagram depicting an example scenario under schemes in accordance with implementations of the present disclosure.

In a wireless communication system, some data compression mechanisms may be used to compress a data packet to increase the bandwidth utilization. The data compression mechanisms may comprise, for example and without limitations, ROHC or UDC. FIG. 1 illustrates an example scenario 100 under schemes in accordance with implementations of the present disclosure. Scenario 100 involves a UE and a network apparatus, which may be a part of a wireless communication network (e.g., an LTE network, an LTE-Advanced network, an LTE-Advanced Pro network, a 5G network, an NR network, an IoT network or an NB-IoT network). After a connection is established between the UE and the network apparatus, the network apparatus may transmit an UL grant indication to the UE. The UE may be able to transmit UL data on the UL grant. The UE may be configured to generate an UL SDU. The UE may perform the data compression mechanism to the UL SDU and generate a compressed UL SDU. The UE may store the compressed UL SDU in a queue or a buffer for waiting for transmission. The UE may add some header to the compressed UL SDU and transmit the UL data to the network apparatus.

When some errors happen, the network apparatus may not be able to decompress the UL data and may indicate the decompression failure to the UE. In response to the decompression failure, the UE should reset or reinitialize the compression parameters being used by the session. However, there may be some compressed UL SDUs that have not been transmitted to the network apparatus. It is very likely that the network apparatus may drop those data due to decompression failure if the UE does not handle or re-compress those data. Alternatively, after resetting or reinitializing the compression parameters, the UE may perform re-compression to those compressed UL SDUs and transmit the re-compressed data to the network apparatus. The re-compressed data may be able to correctly be decompressed at the network apparatus. However, this may increase end-to-end latency due to the additional re-compression procedures. For some scenarios or applications, such extra latency may seriously affect the performance of the UE or the user experiences.

Figure 2:
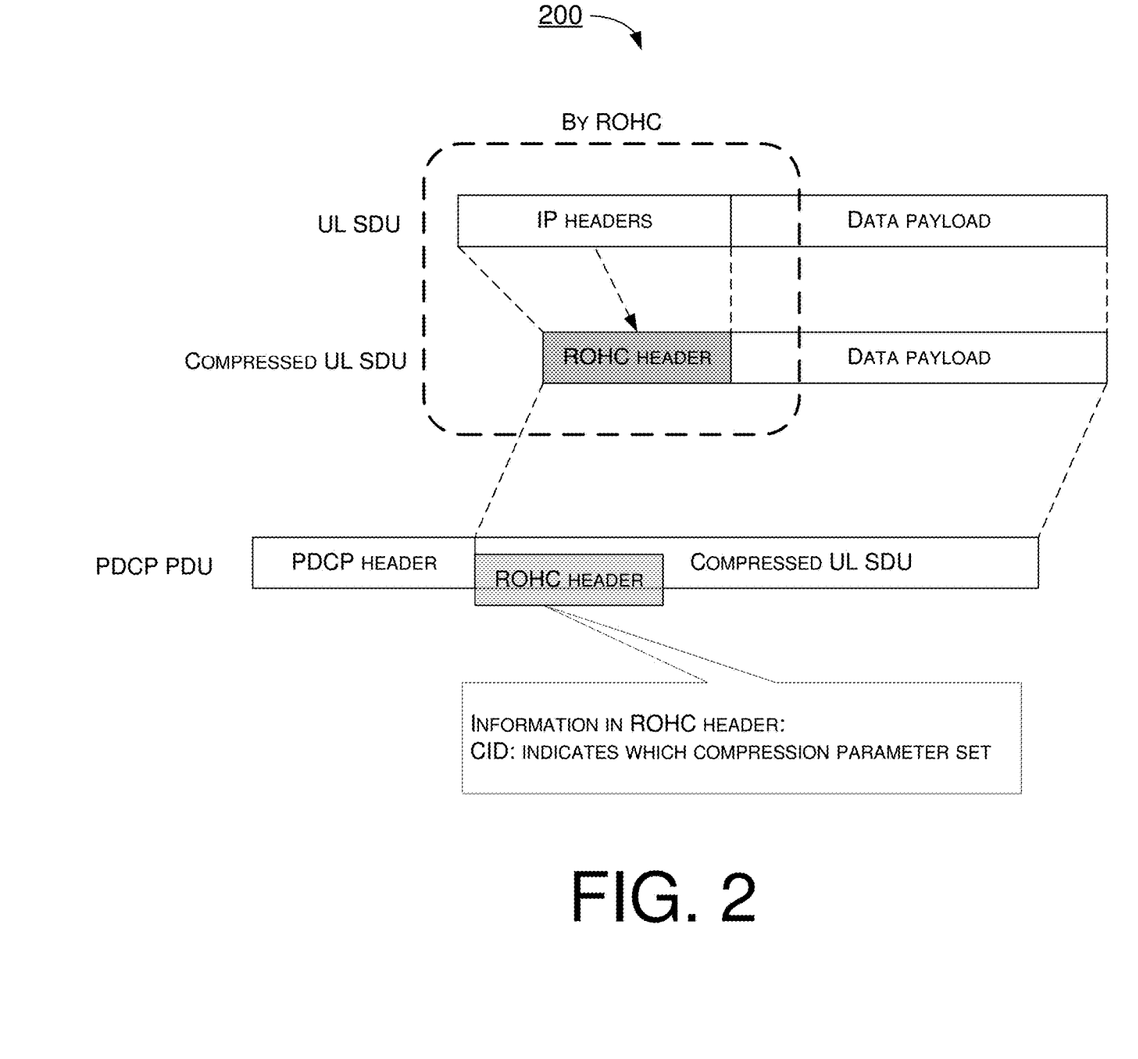
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a UE and a network apparatus, which may be a part of a wireless communication network (e.g., an LTE network, an LTE-Advanced network, an LTE-Advanced Pro network, a 5G network, an NR network, an IoT network or an NB-IoT network). FIG. 2 illustrates an example ROHC process. The UE may be configured to generate an UL SDU for UL transmission. The UL SDU may comprise internet protocol (IP) headers and the data payload. The UE may be configured to perform the ROHC to the UL SDU to generate a compressed UL SDU. The compressed UL SDU may comprise an ROHC header and the data payload. The ROHC header may comprise a context identification (CID) to indicate which compression parameter set is used for data compression (e.g., CID=0). The UE may further be configured to generate a protocol data unit (PDU) (e.g., packet data convergence protocol (PDCP) PDU). The PDCP PDU may comprise a PDCP header and the compressed SDU. The UE may transmit the PDCP PDU to the network apparatus.

Figure 3:
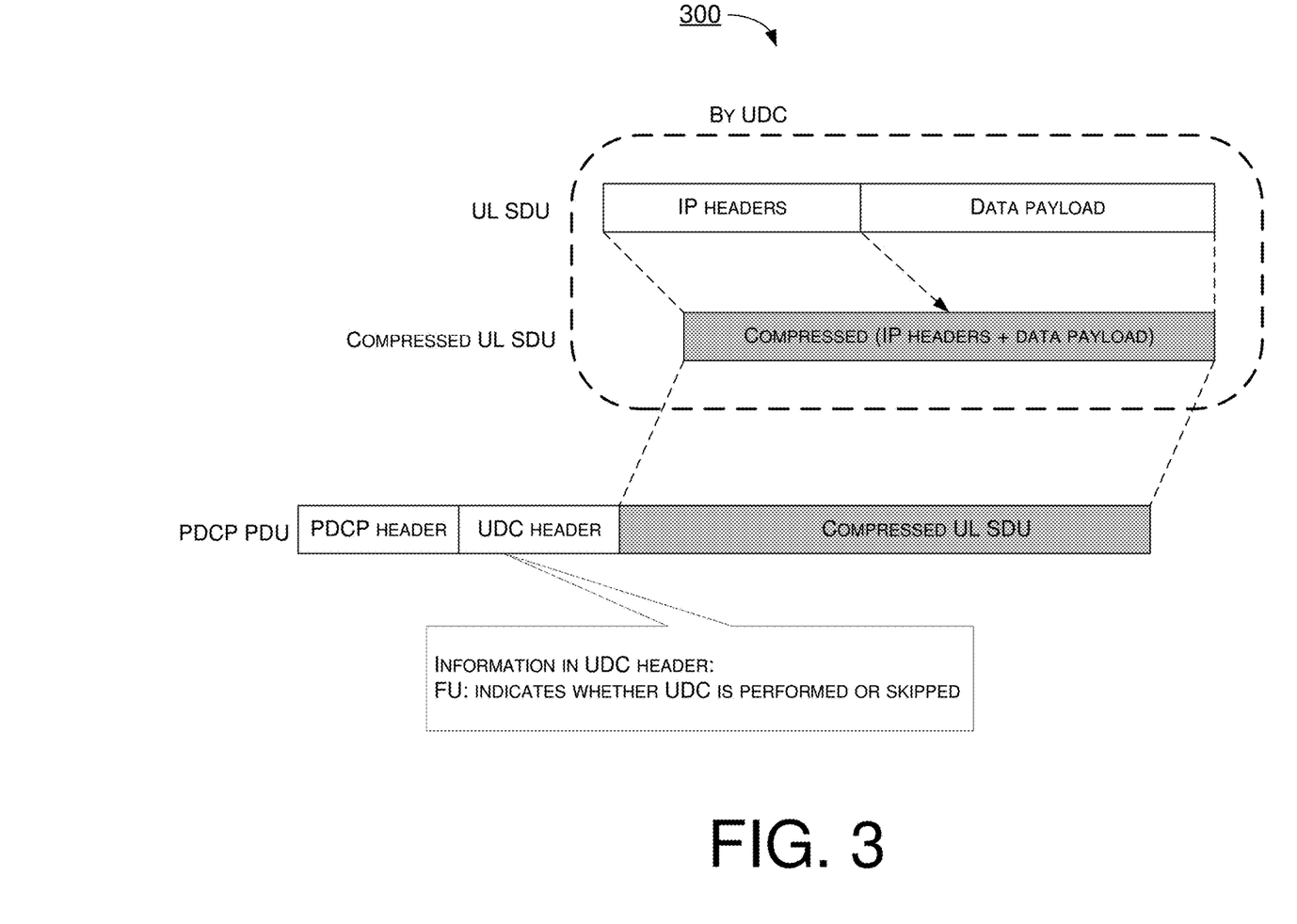
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE and a network apparatus, which may be a part of a wireless communication network (e.g., an LTE network, an LTE-Advanced network, an LTE-Advanced Pro network, a 5G network, an NR network, an IoT network or an NB-IoT network). FIG. 3 illustrates an example UDC process. The UE may be configured to generate an UL SDU for UL transmission. The UL SDU may comprise IP headers and the data payload. The UE may be configured to perform the UDC to the UL SDU to generate a compressed UL SDU. The UE may compress both the IP headers and the data payload. The compressed UL SDU may comprise the compressed IP headers and the compressed data payload. The UE may further be configured to generate a PDU (e.g., PDCP PDU). The PDCP PDU may comprise a PDCP header, a UDC header and the compressed SDU. The UDC header may comprise an FU bit to indicate whether the UDC is performed or skipped. The UE may transmit the PDCP PDU to the network apparatus.

In view of the above, the present disclosure proposes a number of schemes pertaining to compression error handling with respect to the UE and the network apparatus. The UE may be configured to transmit a compressed PDU to the network apparatus. When some errors happen, the network apparatus may not be able to decompress the compressed PDU and may transmit a negative acknowledgement (NACK) message or an error message to the UE. After receiving the NACK or error message, the UE may be configured to restore the compressed SDU to original data (e.g., uncompressed data). The compressed SDU may be compressed by the old compression parameter set and stored in a queue or a buffer. Then, the UE may be configured to transmit the original data with an uncompressed format to the network apparatus. The UE may use an indication to indicate that the transmitted packet is not compressed. Thus, the network apparatus may be able to receive and decompress the packet successfully.

Figure 4:
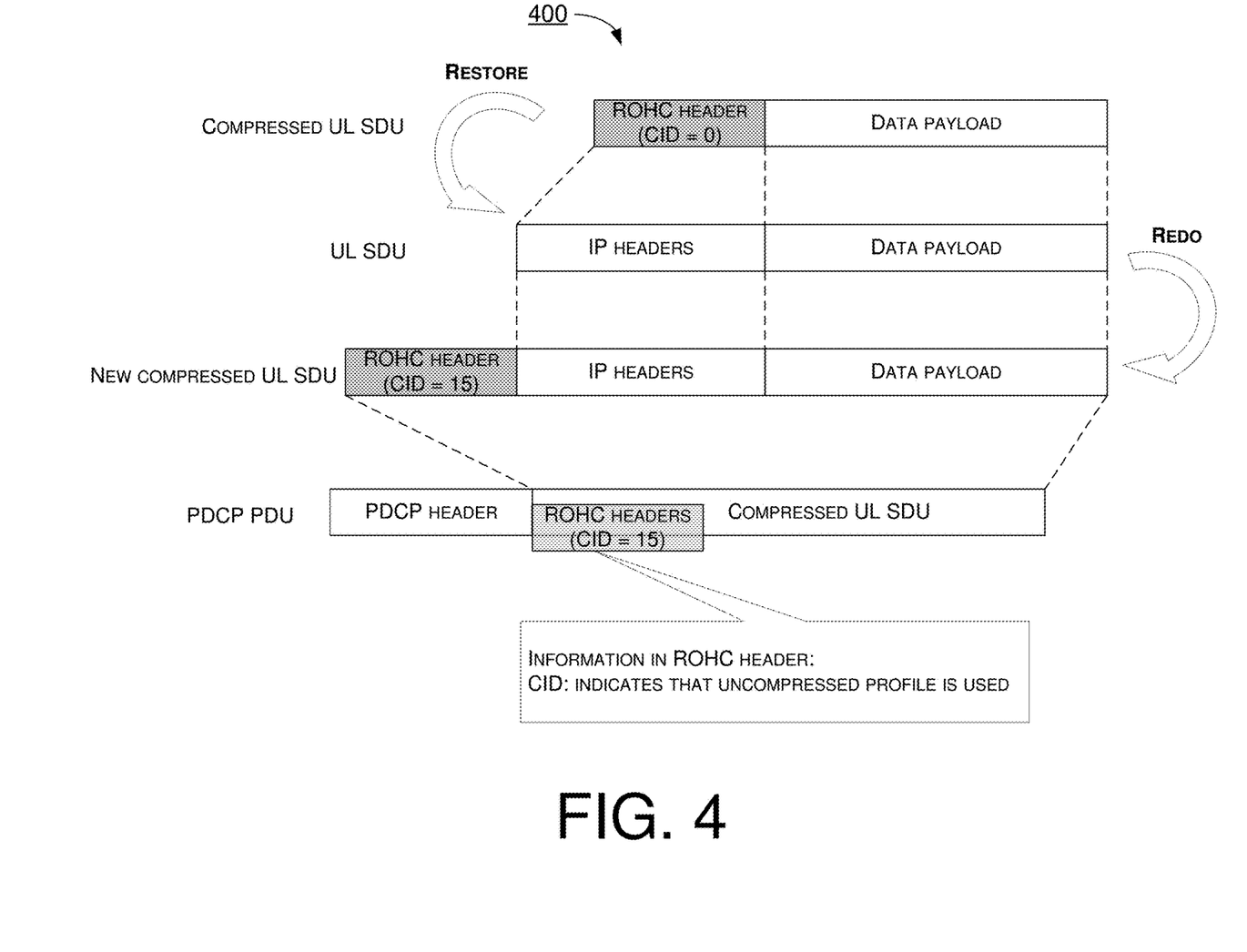
FIG. 4 is a diagram depicting an example scenario under schemes in accordance with implementations of the present disclosure.

FIG. 4 illustrates an example scenario 400 under schemes in accordance with implementations of the present disclosure. Scenario 400 involves a UE and a network apparatus, which may be a part of a wireless communication network (e.g., an LTE network, an LTE-Advanced network, an LTE-Advanced Pro network, a 5G network, an NR network, an IoT network or an NB-IoT network). After receiving the NACK or error message from the network apparatus, the UE may be configured to restore the compressed UL SDU. The UE may retrieve the compressed UL SDU from a queue or a buffer. The compressed UL SDU may comprise the ROHC header and the data payload. The ROHC header of the compressed UL SDU may comprise a CID indicating a transmission control protocol (TCP) profile (e.g., CID=0). The CID may indicate which compression parameter set is used. The UE may restore the compressed UL SDU to an original UL SDU. The original UL SDU may comprise the IP headers without compression and the data payload.

The UE may be configured to perform the ROHC to the original UL SDU by using an uncompressed profile. Specifically, the UE may be configured not to compress the IP headers and the data payload. The UE may add an ROHC header to the original UL SDU to generate a new compressed UL SDU. The ROHC header may comprise a CID indicating an uncompressed profile. "CID=15" may be used to represent that the uncompressed profile is used, which means no compression is used. The UE may be configured to generate a new PDU (e.g., PDCP PDU). The new PDCP PDU may comprise a PDCP header and the new compressed UL SDU. The UE may transmit the PDCP PDU to the network apparatus.

Figure 5:
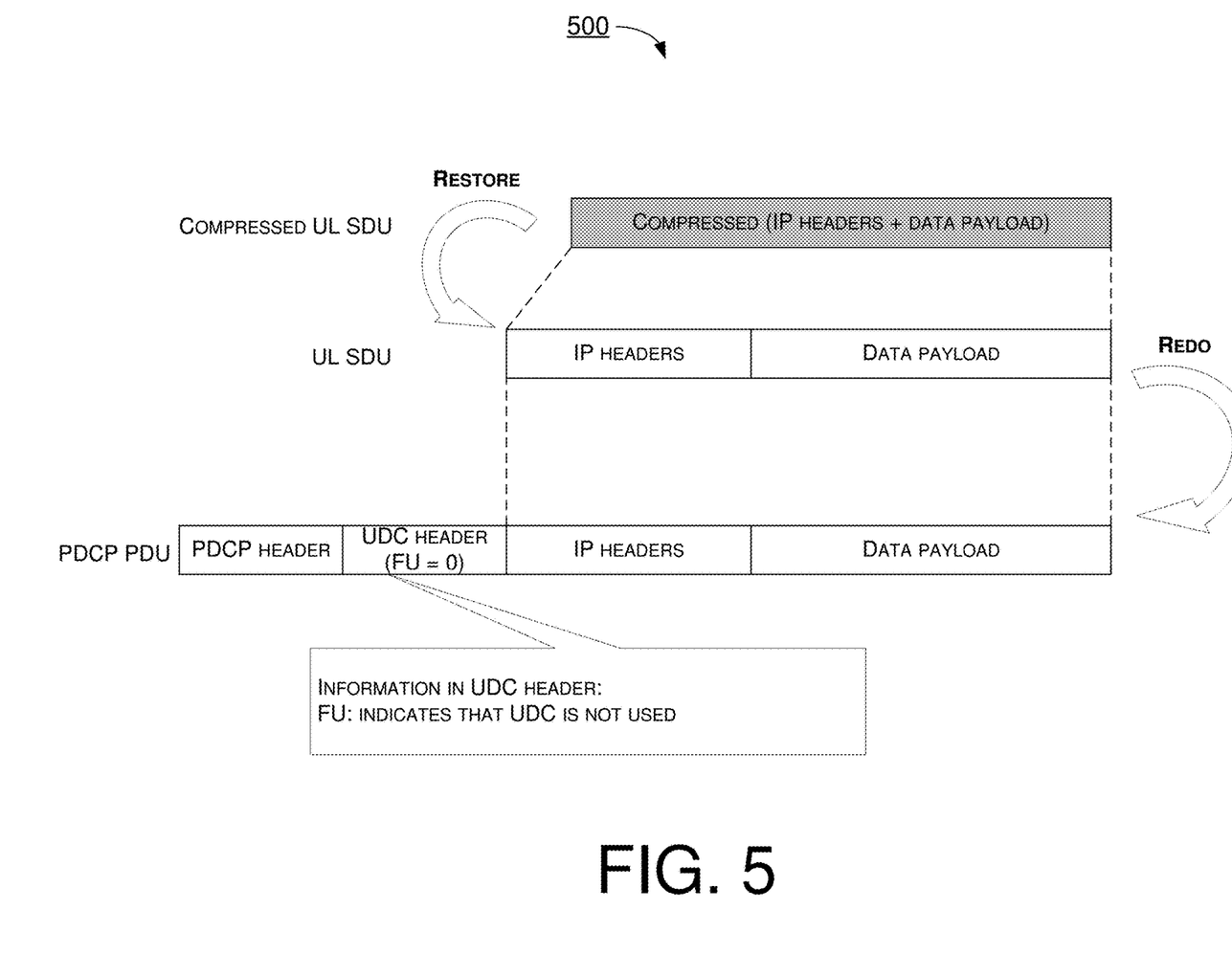
FIG. 5 is a diagram depicting an example scenario under schemes in accordance with implementations of the present disclosure.

FIG. 5 illustrates an example scenario 500 under schemes in accordance with implementations of the present disclosure. Scenario 500 involves a UE and a network apparatus, which may be a part of a wireless communication network (e.g., an LTE network, an LTE-Advanced network, an LTE-Advanced Pro network, a 5G network, an NR network, an IoT network or an NB-IoT network). After receiving the NACK or error message from the network apparatus, the UE may be configured to restore the compressed UL SDU. The UE may retrieve the compressed UL SDU from a queue or a buffer. The compressed UL SDU may comprise the compressed header and the compressed data payload. The UE may restore the compressed UL SDU to an original UL SDU. The original UL SDU may comprise the IP headers without compression and the data payload without compression.

The UE may be configured to generate a PDU (e.g., PDCP PDU) according to the original UL SDU. The PDCP PDU may comprise a PDCP header, a UDC header and the original UL SDU (e.g., the IP headers without compression and the data payload without compression). The UDC header may comprise an FU bit to indicate that the UDC is not used or is skipped. "FU=0" may be used to represent that the UDC is not used or is skipped. The UE may transmit the PDCP PDU to the network apparatus.

Accordingly, the network apparatus may be able to receive the transmitted PDCP PDU correctly and avoid decompression failure. By transmitting the original data with the uncompressed format, the UE may be able to minimize the impact of packet loss and reduce the retransmission penalty of the upper layer (e.g., TCP retransmission). On the other hand, since the compressed SDU is restored to the original data and transmitted without further re-compression, the UE may also minimize the extra packet delay due to the re-compression procedures. Therefore, in response to the decompression failure at the network apparatus, the UE may be able to use minimum efforts to recover the compression error.

Illustrative Implementations

Figure 6:
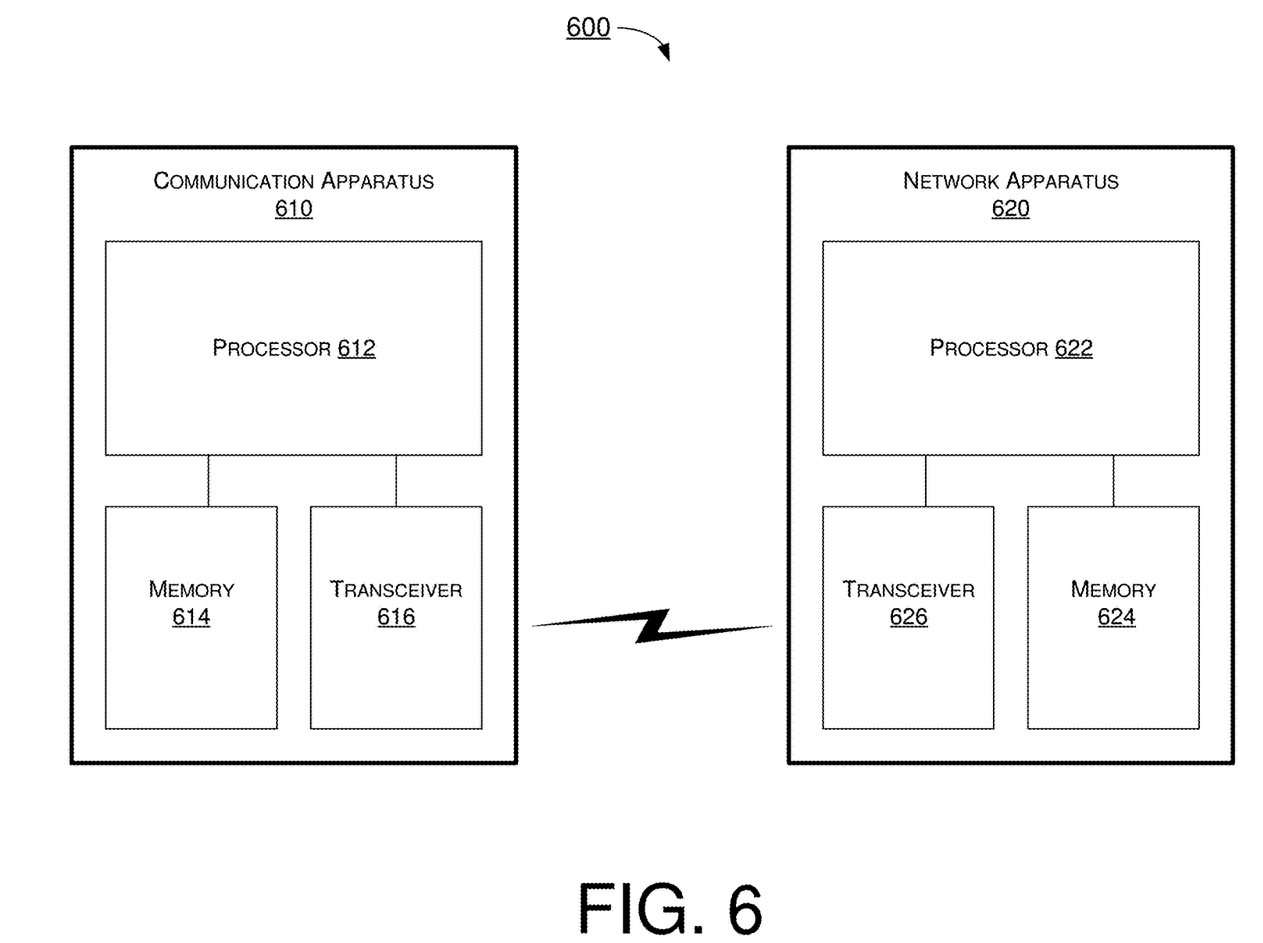
FIG. 6 is a block diagram of an example communication apparatus and an example network apparatus in accordance with an implementation of the present disclosure.
Figure 7:
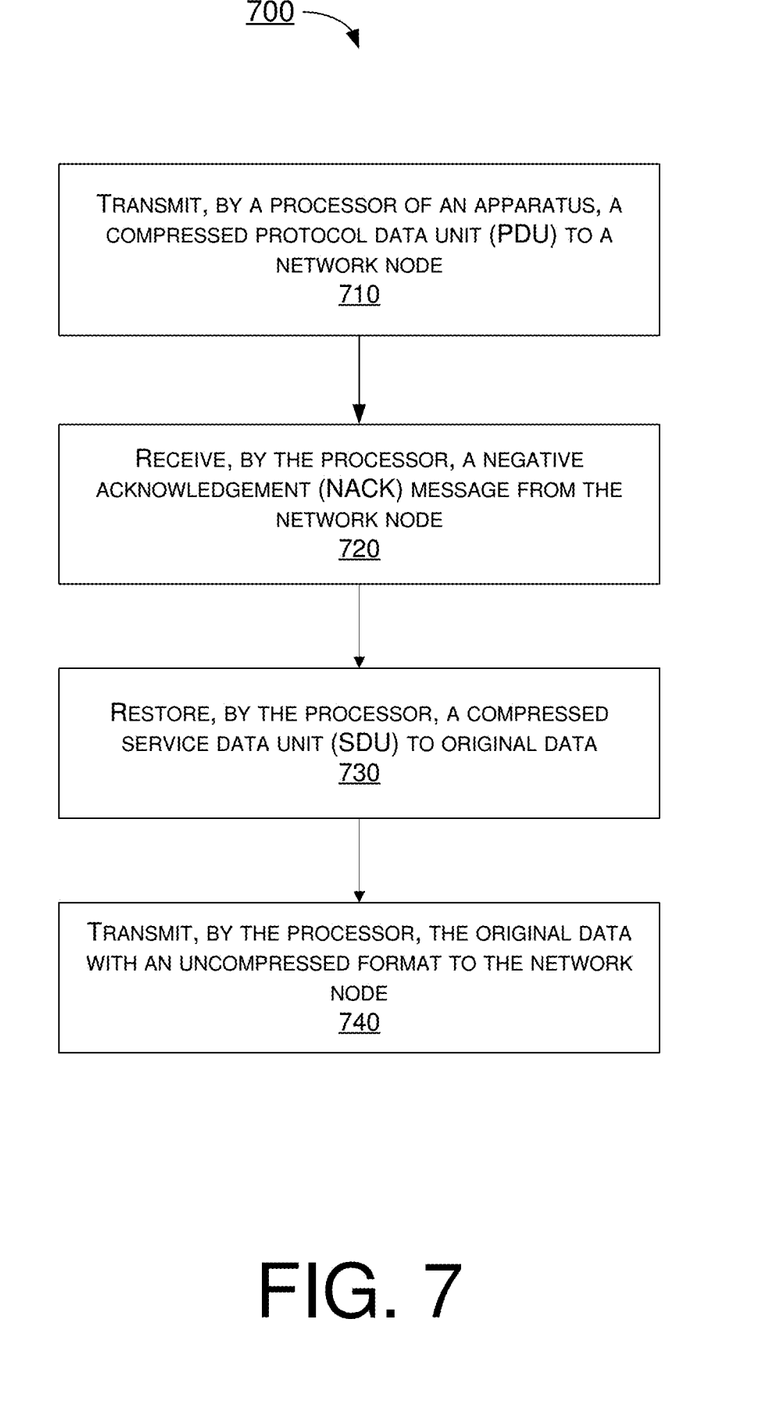
FIG. 7 is a flowchart of an example process in accordance with an implementation of the present disclosure.

FIG. 6 illustrates an example communication apparatus 610 and an example network apparatus 620 in accordance with an implementation of the present disclosure. Each of communication apparatus 610 and network apparatus 620 may perform various functions to implement schemes, techniques, processes and methods described herein pertaining to compression error handling with respect to user equipment and network apparatus in wireless communications, including scenarios 400 and 500 described above as well as processes 700 described below.

Communication apparatus 610 may be a part of an electronic apparatus, which may be a UE such as a portable or mobile apparatus, a wearable apparatus, a wireless communication apparatus or a computing apparatus. For instance, communication apparatus 610 may be implemented in a smartphone, a smartwatch, a personal digital assistant, a digital camera, or a computing equipment such as a tablet computer, a laptop computer or a notebook computer. Communication apparatus 610 may also be a part of a machine type apparatus, which may be an IoT or NB-IoT apparatus such as an immobile or a stationary apparatus, a home apparatus, a wire communication apparatus or a computing apparatus. For instance, communication apparatus 610 may be implemented in a smart thermostat, a smart fridge, a smart door lock, a wireless speaker or a home control center. Alternatively, communication apparatus 610 may be implemented in the form of one or more integrated-circuit (IC) chips such as, for example and without limitation, one or more single-core processors, one or more multi-core processors, or one or more complex-instruction-set-computing (CISC) processors. Communication apparatus 610 may include at least some of those components shown in FIG. 6 such as a processor 612, for example. Communication apparatus 610 may further include one or more other components not pertinent to the proposed scheme of the present disclosure (e.g., internal power supply, display device and/or user interface device), and, thus, such component(s) of communication apparatus 610 are neither shown in FIG. 6 nor described below in the interest of simplicity and brevity.

Network apparatus 620 may be a part of an electronic apparatus, which may be a network node such as a base station, a small cell, a router or a gateway. For instance, network apparatus 620 may be implemented in an eNodeB in a LTE, LTE-Advanced or LTE-Advanced Pro network or in a gNB in a 5G, NR, IoT or NB-IoT network. Alternatively, network apparatus 620 may be implemented in the form of one or more IC chips such as, for example and without limitation, one or more single-core processors, one or more multi-core processors, or one or more CISC processors. Network apparatus 620 may include at least some of those components shown in FIG. 6 such as a processor 622, for example. Network apparatus 620 may further include one or more other components not pertinent to the proposed scheme of the present disclosure (e.g., internal power supply, display device and/or user interface device), and, thus, such component(s) of network apparatus 620 are neither shown in FIG. 6 nor described below in the interest of simplicity and brevity.

In one aspect, each of processor 612 and processor 622 may be implemented in the form of one or more single-core processors, one or more multi-core processors, or one or more CISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including power consumption reduction in a device (e.g., as represented by communication apparatus 610) and a network (e.g., as represented by network apparatus 620) in accordance with various implementations of the present disclosure.

In some implementations, communication apparatus 610 may also include a transceiver 616 coupled to processor 612 and capable of wirelessly transmitting and receiving data. In some implementations, communication apparatus 610 may further include a memory 614 coupled to processor 612 and capable of being accessed by processor 612 and storing data therein. In some implementations, network apparatus 620 may also include a transceiver 626 coupled to processor 622 and capable of wirelessly transmitting and receiving data. In some implementations, network apparatus 620 may further include a memory 624 coupled to processor 622 and capable of being accessed by processor 622 and storing data therein. Accordingly, communication apparatus 610 and network apparatus 620 may wirelessly communicate with each other via transceiver 616 and transceiver 626, respectively. To aid better understanding, the following description of the operations, functionalities and capabilities of each of communication apparatus 610 and network apparatus 620 is provided in the context of a mobile communication environment in which communication apparatus 610 is implemented in or as a communication apparatus or a UE and network apparatus 620 is implemented in or as a network node of a communication network.

In some implementations, processor 612 may be configured to transmit, via transceiver 616, a compressed PDU to network apparatus 620. When some errors happen, processor 622 may not be able to decompress the compressed PDU and may transmit, via transceiver 626, a NACK message or an error message to communication apparatus 610. After receiving the NACK or error message, processor 612 may be configured to restore the compressed SDU to original data (e.g., uncompressed data). The compressed SDU may be compressed by the old compression parameter set and stored in a queue or a buffer. Then, processor 612 may be configured to transmit the original data with an uncompressed format to network apparatus 620. Processor 612 may use an indication to indicate that the transmitted packet is not compressed. Thus, processor 622 may be able to receive and decompress the packet successfully.

In some implementations, after receiving the NACK or error message from network apparatus 620, processor 612 may be configured to restore the compressed UL SDU. Processor 612 may retrieve the compressed UL SDU from a queue or a buffer. The compressed UL SDU may comprise the ROHC header and the data payload. The ROHC header of the compressed UL SDU may comprise a CID indicating a TCP profile (e.g., CID=0). The CID may indicate which compression parameter set is used. Processor 612 may restore the compressed UL SDU to an original UL SDU. The original UL SDU may comprise the IP headers without compression and the data payload.

In some implementations, processor 612 may be configured to perform the ROHC to the original UL SDU by using an uncompressed profile. Specifically, processor 612 may be configured not to compress the IP headers and the data payload. Processor 612 may add an ROHC header to the original UL SDU to generate a new compressed UL SDU. The ROHC header may comprise a CID indicating an uncompressed profile. Processor 612 may use "CID=15" to represent that the uncompressed profile is used, which means no compression is used. Processor 612 may be configured to generate a new PDU (e.g., PDCP PDU). The new PDCP PDU may comprise a PDCP header and the new compressed UL SDU. Processor 612 may transmit, via transceiver 616, the PDCP PDU to network apparatus 620.

In some implementations, after receiving the NACK or error message from the network apparatus, processor 612 may be configured to restore the compressed UL SDU. Processor 612 may retrieve the compressed UL SDU from a queue or a buffer. The compressed UL SDU may comprise the compressed header and the compressed data payload. Processor 612 may restore the compressed UL SDU to an original UL SDU. The original UL SDU may comprise the IP headers without compression and the data payload without compression.

In some implementations, processor 612 may be configured to generate a PDU (e.g., PDCP PDU) according to the original UL SDU. The PDCP PDU may comprise a PDCP header, a UDC header and the original UL SDU (e.g., the IP headers without compression and the data payload without compression). The UDC header may comprise an FU bit to indicate that the UDC is not used or is skipped. Processor 612 may use "FU=0" to represent that the UDC is not used or is skipped. Processor 612 may transmit, via transceiver 616, the PDCP PDU to network apparatus 620.

Accordingly, processor 622 may be able to receive the transmitted PDCP PDU correctly and avoid decompression failure. By transmitting the original data with the uncompressed format, processor 612 may be able to minimize the impact of packet loss and reduce the retransmission penalty of the upper layer (e.g., TCP retransmission). On the other hand, since the compressed SDU is restored to the original data and transmitted without further re-compression, processor 612 may also minimize the extra packet delay due to the re-compression procedures. Therefore, in response to the decompression failure at network apparatus 620, processor 612 may be able to use minimum efforts to recover the compression error.

Illustrative Processes

FIG. 7 illustrates an example process 700 in accordance with an implementation of the present disclosure. Process 700 may be an example implementation of scenarios 400 and 500, whether partially or completely, with respect to compression error handling in accordance with the present disclosure. Process 700 may represent an aspect of implementation of features of communication apparatus 610. Process 700 may include one or more operations, actions, or functions as illustrated by one or more of blocks 710, 720, 730 and 740. Although illustrated as discrete blocks, various blocks of process 700 may be divided into additional blocks, combined into fewer blocks, or eliminated, depending on the desired implementation. Moreover, the blocks of process 700 may executed in the order shown in FIG. 7 or, alternatively, in a different order. Process 700 may be implemented by communication apparatus 610 or any suitable UE or machine type devices. Solely for illustrative purposes and without limitation, process 700 is described below in the context of communication apparatus 610. Process 700 may begin at block 710.

At 710, process 700 may involve processor 612 of communication apparatus 610 transmitting a compressed PDU to a network node. Process 700 may proceed from 710 to 720.

At 720, process 700 may involve processor 612 receiving a NACK message from the network node. Process 700 may proceed from 720 to 730.

At 730, process 700 may involve processor 612 restoring a compressed SDU to original data. Process 700 may proceed from 730 to 740.

At 740, process 700 may involve processor 612 transmitting the original data with an uncompressed format to the network node.

In some implementations, the compressed SDU may be stored in a queue or a buffer.

In some implementations, process 700 may involve processor 612 performing ROHC to the original data by using an uncompressed profile. Process 700 may further involve processor 612 generating a new PDU comprising an ROHC header indicating the uncompressed profile. Process 700 may further involve processor 612 transmitting the new PDU to the network node.

In some implementations, the ROHC header may comprise a CID to indicate the uncompressed profile. The CID may equal to 15.

In some implementations, process 700 may involve processor 612 generating a new PDU comprising an uplink UDC header indicating that UDC is not used. Process 700 may further involve processor 612 transmitting the new PDU to the network node.

In some implementations, the UDC header may comprise an FU bit to indicate that the UDC is not used. The FU bit may equal to 0.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
transmitting, by a processor of an apparatus, a compressed protocol data unit (PDU) to a network node;

receiving, by the processor, a negative acknowledgement (NACK) message from the network node;

restoring, by the processor, a compressed service data unit (SDU) to original data; and transmitting, by the processor, the original data with an uncompressed format to the network node.

2. The method of claim 1, wherein the compressed SDU is stored in a queue.

3. The method of claim 1, wherein the transmitting of the original data with the uncompressed format comprises:

performing, by the processor, robust header compression (ROHC) to the original data by using an uncompressed profile;

generating, by the processor, a new PDU comprising an ROHC header indicating the uncompressed profile; and transmitting, by the processor, the new PDU to the network node.

4. The method of claim 3, wherein the ROHC header comprises a context identification (CID) to indicate the uncompressed profile.

5. The method of claim 1, wherein the transmitting of the original data with the uncompressed format comprises:

generating, by the processor, a new PDU comprising an uplink data compression (UDC) header indicating that UDC is not used; and transmitting, by the processor, the new PDU to the network node.

6. The method of claim 5, wherein the UDC header comprises an FU bit to indicate that the UDC is not used.

7. The method of claim 6, wherein the FU bit equals to 0.

8. An apparatus, comprising:

a transceiver capable of wirelessly communicating with a network node of a wireless network; and a processor communicatively coupled to the transceiver, the processor capable of:

transmitting, via the transceiver, a compressed protocol data unit (PDU) to the network node;

receiving, via the transceiver, a negative acknowledgement (NACK) message from the network node;

restoring a compressed service data unit (SDU) to original data; and transmitting, via the transceiver, the original data with an uncompressed format to the network node.

9. The apparatus of claim 8, wherein the compressed SDU is stored in a queue.

10. The apparatus of claim 8, wherein, in transmitting the original data with the uncompressed format, the processor is capable of:

performing robust header compression (ROHC) to the original data by using an uncompressed profile;

generating a new PDU comprising an ROHC header indicating the uncompressed profile; and transmitting, via the transceiver, the new PDU to the network node.

11. The apparatus of claim 10, wherein the ROHC header comprises a context identification (CID) to indicate the uncompressed profile.

12. The apparatus of claim 8, wherein, in transmitting the original data with the uncompressed format, the processor is capable of:

generating a new PDU comprising an uplink data compression (UDC) header indicating that UDC is not used; and transmitting, via the transceiver, the new PDU to the network node.

13. The apparatus of claim 12, wherein the UDC header comprises an FU bit to indicate that the UDC is not used.

14. The apparatus of claim 13, wherein the FU bit equals to 0.

* * * * *